United States Patent [19]
Kleifges et al.

[11] Patent Number: 5,771,999
[45] Date of Patent: Jun. 30, 1998

[54] CLUTCH DISC WITH A COMPOUND FRICTION DISC

[75] Inventors: Jürgen Kleifges, Schweinfurt; Matthias Fischer, Eltingshausen; Norbert Lohaus, Schweinfurt, all of Germany

[73] Assignee: Fichtel & Sachs AG, Schweinfurt, Germany

[21] Appl. No.: 688,396

[22] Filed: Jul. 30, 1996

[30] Foreign Application Priority Data

Aug. 1, 1995 [DE] Germany .......................... 195 28 143.8
Apr. 9, 1996 [DE] Germany .......................... 196 14 002.1

[51] Int. Cl.[6] .............................. F16D 13/64; F16D 3/14
[52] U.S. Cl. ................................ 192/213.12; 192/70.17; 192/214.1; 464/68
[58] Field of Search .......................... 192/213.12, 213.22, 192/210, 210.1, 213.11, 213.21, 213.3, 213.31, 214, 214.1, 70.17; 464/66, 68

[56] References Cited

U.S. PATENT DOCUMENTS

| | | |
|---|---|---|
| 4,014,423 | 3/1977 | Werner et al. . |
| 4,212,380 | 7/1980 | Billet ................................. 192/213.22 |
| 4,274,525 | 6/1981 | Raab et al. . |
| 4,579,212 | 4/1986 | Kittel .................................. 192/213.31 |
| 4,655,336 | 4/1987 | Caspar et al. . |
| 4,697,682 | 10/1987 | Alas et al. ................................ 464/68 |
| 4,715,485 | 12/1987 | Rostin et al. .................... 192/214.1 X |
| 4,993,530 | 2/1991 | Maki .................................. 192/213.22 |

FOREIGN PATENT DOCUMENTS

| | | |
|---|---|---|
| 2610081 | 9/1977 | Germany . |
| 2758650 | 7/1978 | Germany . |
| 2906675 | 9/1980 | Germany . |
| 3345409 | 6/1985 | Germany . |
| 3409868 | 9/1985 | Germany . |
| 2080488 | 2/1982 | United Kingdom . |
| 2127131 | 4/1984 | United Kingdom ..................... 464/68 |
| 2181817 | 4/1987 | United Kingdom . |

*Primary Examiner*—Richard M. Lorence
*Attorney, Agent, or Firm*—Nils H. Ljungman and Associates

[57] ABSTRACT

A clutch disc for a motor vehicle clutch which has an input part and an output part with relative rotational play. A friction device is located between the input part and output part. The friction device includes a friction disc located non-rotationally on the input part or on the output part, which friction disc has friction areas which have different coefficients of friction around its periphery, There also are contact areas which in the effective range of angular rotation of the clutch disc move essentially from one friction area at least partly to another friction area.

20 Claims, 3 Drawing Sheets

CLUTCH DISC WITH A COMPOUND FRICTION DISC

BACKGROUND OF THE INVENTION

1. Field of the Invention

The present invention relates generally to a clutch disc for a friction clutch as is typically used in a motor vehicle. More specifically, the present invention relates to a clutch disc having an input part provided with friction linings, an output part with internal gear teeth for non-rotational attachment to a transmission input shaft, the input part and the output part being concentrically mounted for their mutually restricted rotation against the force of at least one spring device of a load suspension system, and at least one friction device which is active in the event of relative rotation of the input part and output part, which friction device is located between facing sides of the input part and output part and is under the force of an axially acting device.

2. Background Information

A clutch disc is described in U.S. Pat. No. 4,655,336. On this known clutch disc, a friction disc is used which has a plurality of friction areas having different coefficients of friction and are distributed over the periphery. This friction disc interacts with a segment disc which makes it possible to have an influence on the coefficient of friction even after the assembly of the clutch disc, because the segment disc with its segments is set to correspond to the corresponding area of the friction disc. It thereby becomes possible to set a higher or lower coefficient of friction to, for example, compensate for the fluctuations of the springs which generate the application force. In any case, the angular areas of the friction lining segments are larger than the possible angle of rotation inside the clutch disc. It is thereby guaranteed that the friction, once it has been set, will remain relatively constant regardless of the angle of rotation.

U.S. Pat. No. 4,274,525 describes a clutch disc, wherein the friction force can be modified as a function of the angular rotation. The result is achieved by having the friction segments run up an axially cushioned ramp; the friction force can thereby be varied as a function of the angle of rotation and the slope of the ramp.

OBJECT OF THE INVENTION

The object of this invention is to generate a friction force which is variable over the angle of rotation, and to use the simplest construction possible while achieving a high degree of consistency in the generation of the friction forces.

SUMMARY OF THE INVENTION

The invention teaches that this object can be accomplished by the friction device including a friction disc non-rotatably connected to either the input part or output part of the clutch disc. The present invention teaches that the friction device can contain a concentric friction disc which has a plurality of friction areas distributed over the periphery which have different coefficients of friction, whereby the friction disc is non-rotationally located on one of the components, i.e. the input part or output part, and the other component is in contact with the friction disc by means of specified contact areas, so that each contact area, in the context of the possible relative rotation, can travel essentially from one friction area at least partly to another friction area.

As a result of such a configuration of the friction device, the axial acting device, or spring device, which is used can easily be held in place. For example, a simple spring biased in a specified axial space can be used. On the other hand it is possible, as a result of the use of a friction disc which has areas with different coefficients of friction located around the circumference, to modify the friction force as a function of the angle of rotation. It is also possible, by means of the contact area, to change over from one friction area into the other friction area, whereby the change in friction force can be realized as quickly as possible. It is also possible, for example, to move from one friction area only partly into the other friction area, in which case a somewhat slower and more gradual change in the friction force can be realized. Other possibilities for the generation of the forces involved are also conceivable, e.g. electromagnetic devices etc.

The present invention also teaches that the friction disc, on the side facing the contact areas, has friction areas which have different coefficients of friction. Such a configuration is advantageous if the friction disc does not consist entirely of different materials, but has friction areas which have different coefficients of friction only on the side facing the contact areas.

The present invention further teaches that it is advantageous if the friction disc is provided with materials which have different coefficients of friction. It is thereby possible, without any major expense or effort, to provide different materials which makes it possible to employ a coefficient of friction which is at all times adapted to the requirements, and is optimized for best performance.

It is also possible, without substantial additional effort, to have the friction disc preferably consist of a combination of a plurality of components preferably two, which have different coefficients of friction. Using a modular system, for example, it would thereby be possible to have a series of friction discs, the shape of which is always the same, and the coefficients of friction of which could be variable within broad ranges.

The present invention teaches that the friction disc can include a carrier which is preferably made of plastic and which carrier has a first, lower coefficient of friction. The carrier can form the one flat friction area which is concentric and perpendicular to the axis of rotation. In the friction area, at least at one point—and preferably at a plurality of points which are distributed over the periphery—there can be a notch, or notched portion of the carrier, which can run essentially radially, in which an insert is located which is made of a material which has a second, preferably higher coefficient of friction, and which insert forms a friction area in the same plane as the friction area of the carrier. As a result of the configuration of notches which can run essentially radially in the carrier, and the use of corresponding inserts made of a material which has a different coefficient of friction, the plane in which the friction is generated remains constant distributed around the periphery. Also there can be a positive, non-rotational drive of the two components in relation to one another. It is thereby also possible to have the notches run not radially, but diagonally or in the shape of a curve, so that, for example, during operation, the transition from one friction area to the other friction area can be made to occur more abruptly or less abruptly.

The present invention teaches that the carrier can include a central opening, that the insert can include a ring which has a plurality of radially projecting tabs, or tab portions, the ring is inserted in the central opening, and the tabs are engaged in the corresponding notches of the carrier. The insert with its tabs can be preferably realized in the form of a single piece, and thus the friction disc need only be composed of two components. This capability simplifies both inventory management and assembly.

The non-rotational connection between the carrier and the input or output part of the clutch disc can be accomplished by means of pins which project axially and can be realized as one piece with the carrier. These pins are engaged essentially without clearance in the peripheral, or tangential, direction in the corresponding matching part. These pins are preferably attached in one piece to the carrier, and the carrier can consist of an injection-molded plastic part.

For the mutual securing of the carrier and the insert after the assembly, the present invention teaches that the ring of the insert can be offset with respect to the tabs axially from the plane of the friction areas toward the carrier, and in the opening of the carrier there can be radially flexible fingers which hold the ring in the pre-assembly position.

To realize additional capabilities for the generation of a graduated friction force, the present invention also teaches that the friction disc, at least at one point on its periphery, can have a flat friction area in a plane which is perpendicular to the axis of rotation. Adjacent to this flat friction area, in each direction of rotation, the friction disc can have at least one additional friction area which defines an angle with the plane. The other component can be realized in a similar manner with flat contact areas, and adjacent to them in each direction of rotation there can be at least one additional contact area which has the same angular inclination, and the flat contact area is larger in the peripheral dimension than the flat friction area. With this construction it is possible, starting from the rest position, to generate a first friction force in a first range of angular rotation, and then, if there is a larger relative rotation, to bring the offset areas into use, whereby the non-offset areas are completely disengaged. Using such a construction it is possible to make the transition from the one friction force to the other relatively suddenly, i.e. without a transition and quickly, which is altogether desirable for many applications.

The other component, adjacent to each offset contact area, can thereby have an additional contact area which runs parallel to the first friction area. Such a configuration makes it possible to generate a third friction force as the angle of rotation continues to increase, whereby it is possible to generate and tune all the friction forces independently of one another.

For the controlled and precise generation of the different friction forces, the present invention further teaches that both the friction disc and the other component can be provided, at least in places, with a coating and/or with a friction lining to generate a controlled friction force.

The friction disc is preferably used in a clutch disc which contains a hub with a hub disc, whereby both are provided with non-rotational toothing and clearance in the peripheral direction corresponding to the range of action of an idle damper, whereby between the two cover plates which function as input parts, the idle damper is located on the one side of the hub disc and the friction disc is located on the other side. However, it is also possible, without the requirement for any further measures, to use a clutch disc which has a non-rotational hub disc without clearance in the peripheral direction, in which case one of the springs of the load spring stage can be used for the spring stage with the lowest spring constant or spring rate.

The coordination of the different friction forces generated by the friction disc can be accomplished in complete disregard of the spring stages of the spring device in the clutch disc. For example, it may be appropriate to provide the friction insert with the higher coefficient friction before or after the insertion, or actuation, of a stage in the load suspension system.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments illustrated in the accompanying drawings:

FIG. 4b shows a second operational phase of the friction device shown in FIG. 4a; and FIG. 4c shows a third operational phase of the friction device shown in FIG. 4a.

DESCRIPTION OF THE PREFERRED EMBODIMENT

Figures 1, 1A:
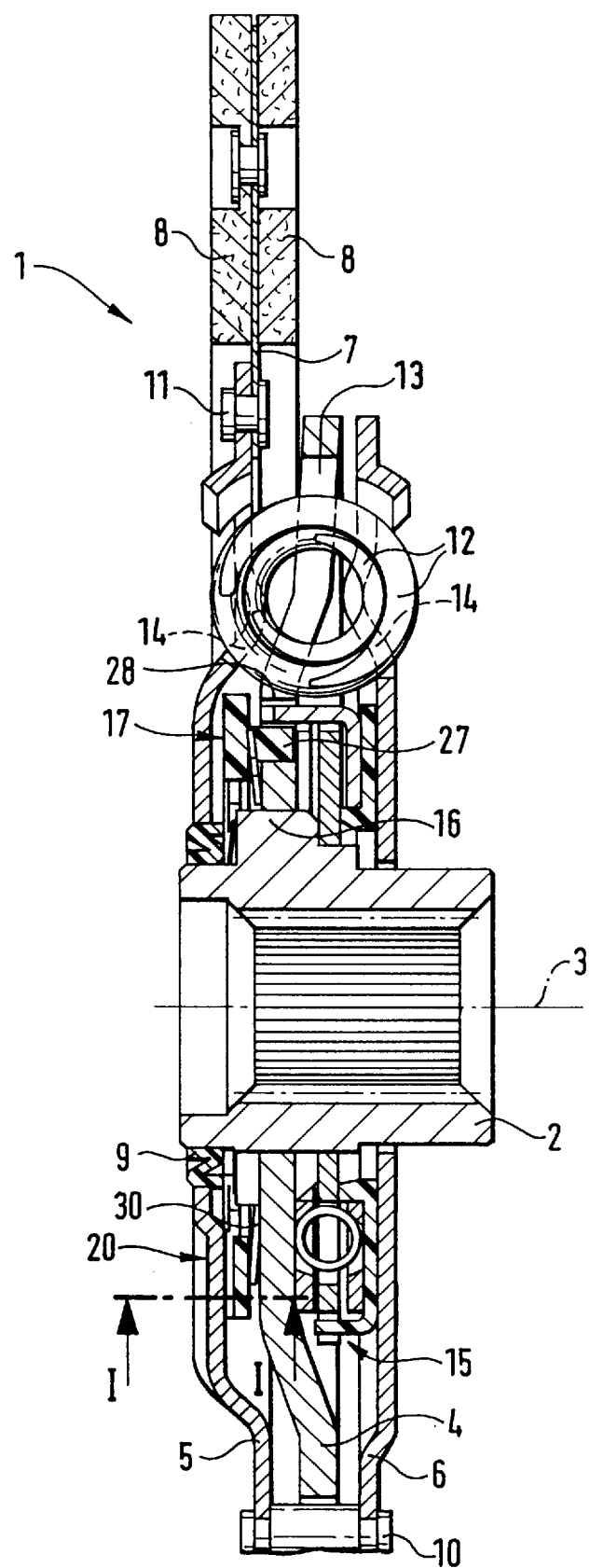
FIG. 1 is a longitudinal section through a clutch disc.
FIG. 1a is a partial section I—I through the friction device of the clutch disc shown in FIG. 1.

FIG. 1 shows a clutch disc 1 which is basically like the known clutch disclosed in British Patent 2 181 817. The hub 2 is located concentric to an axis of rotation 3, and is actively connected to a hub disc 4, whereby between the hub 2 and the hub disc 4 there is toothing 16 which makes possible a non-rotational connection between the hub 2 and the hub disc 4, allowing clearance in the peripheral, or tangential, direction. The hub 2 and the hub disc 4 are the output parts of the clutch disc 1. Acting as the input parts are the two cover plates 5 and 6, which are located alongside the hub disc 4. Each of the two cover plates 5 and 6 are non-rotationally connected to one another and held at a distance from one another by means of rivets 10.

One of the cover plates, as for example cover plate 5 in FIG. 1, in its radially outer area carries one or more lining carriers 7 which are fastened by means of rivets 11. The lining carrier or carriers 7 are provided with friction linings 8. In apertures 13 of the hub disc 4 and in apertures 14 of the cover plates 5 and 6 there are coil springs 12 which represent a load damper, or a spring portion of a load suspension system. Axially between the hub disc 4 and the one cover plate 6 there is an idle damper 15, the schematic diagram and function of which are as described in the above-referenced British patent. Between the hub disc 4 and the other cover plate 5 there is a friction disc 17 which generates a friction force which can be modified by modifying the angle of rotation.

The friction disc 17 in this embodiment consists of two components which are explained in greater detail in connection with FIGS. 2 and 3. Approximately in the radial space occupied by the idle damper 15, on the side opposite the hub disc 4, there is a friction disc 17. The friction disc 17 extends by means of radial pins 27 into corresponding openings 28 in the hub disc 4 for a non-rotational drive. Being a sectional view, only one of the radial pins 27/openings 28 sets are shown. Parts of the idle damper 15 can also be engaged in the same openings 28, and are also non-rotationally connected to the hub disc 4.

The non-rotational drive of the friction disc 17 can also be accomplished indirectly, e.g. if the spring 30 is used not only to generate the axial force, but also to provide the non-rotational drive. For this purpose, the spring 30 can be non-rotationally engaged on one hand with axially-pointing projections of the friction disc 17 and on the other hand with lugs in the openings 28. An axial force is applied to the friction disc 17 by the spring 30, whereby the spring 30 is supported on one hand on the hub 4 and on the other hand on the friction disc 17. The spring 30 thereby pushes the friction disc 17 against corresponding contact areas 20 of the cover plate 5.

FIG. 1 also shows a bearing 9 which is located between an essentially cylindrical extension of the hub 2 and the inside diameter of the cover plate 5 for mutual guidance. Cross section I—I, shown in FIG. 1a, should be considered together with FIGS. 2 and 3. FIGS. 2 and 3 show respectively a plan view and a sectional view of the friction disc 17. The friction disc 17 consists of a carrier 22 which in this case is preferably an injection-molded plastic part. The carrier 22 has pins 27 which project axially, by means of which it is non-rotationally connected to the hub disc 4 by means of corresponding opening 28. An axial movement of the carrier 22 is permitted, however.

The carrier 22 can be realized in the shape of a ring and in the present case has notched portions or notches 21 at four places which are uniformly distributed around the periphery. These notches run essentially in the radial direction and are cut into the friction surfaces which the carrier has on the side opposite the pins 27. Into these notches 21 extend tabbed portions or tabs 26 which run approximately radially from an insert 23, whereby the axial depth of the notches 21 equals the thickness of the material of the tabs 26.

Or, in other words, the sum of the thickness of the carrier 22 notched portions 21 and the thickness of the insert 23 tabbed portions 26 preferably equals the thickness of the non-notched portions of the carrier 22.

A friction surface is thereby formed, viewed from the periphery, or tangential direction. This friction surface can be created by the use of different materials for the carrier 22 and insert 23 to form friction areas 18 and 19 respectively, which have different coefficients of friction. In this case, the coefficient of friction of the carrier 22, which if preferably made of plastic, can be approximately 0.15, for example, while the coefficient of friction of the insert 23, if it is preferably made of metal, can be approximately 0.7.

The insert 23 can have a ring 25 which has a closed periphery and from which the individual tabs 26 extend radially outward. Naturally, it is also possible to omit the ring 25 completely and realize the tabs 26 as inserts. As illustrated in FIG. 3, the ring 25 can also be axially offset from the tabs 26, namely so that it extends into a corresponding opening 24 of the carrier 22. The carrier 22 is thereby provided in its opening 24 with a plurality of fingers 29 which are distributed over the periphery, and which exert a radial spring force and hold the inserted ring 25 by means of the tabs 26.

Figure 2:
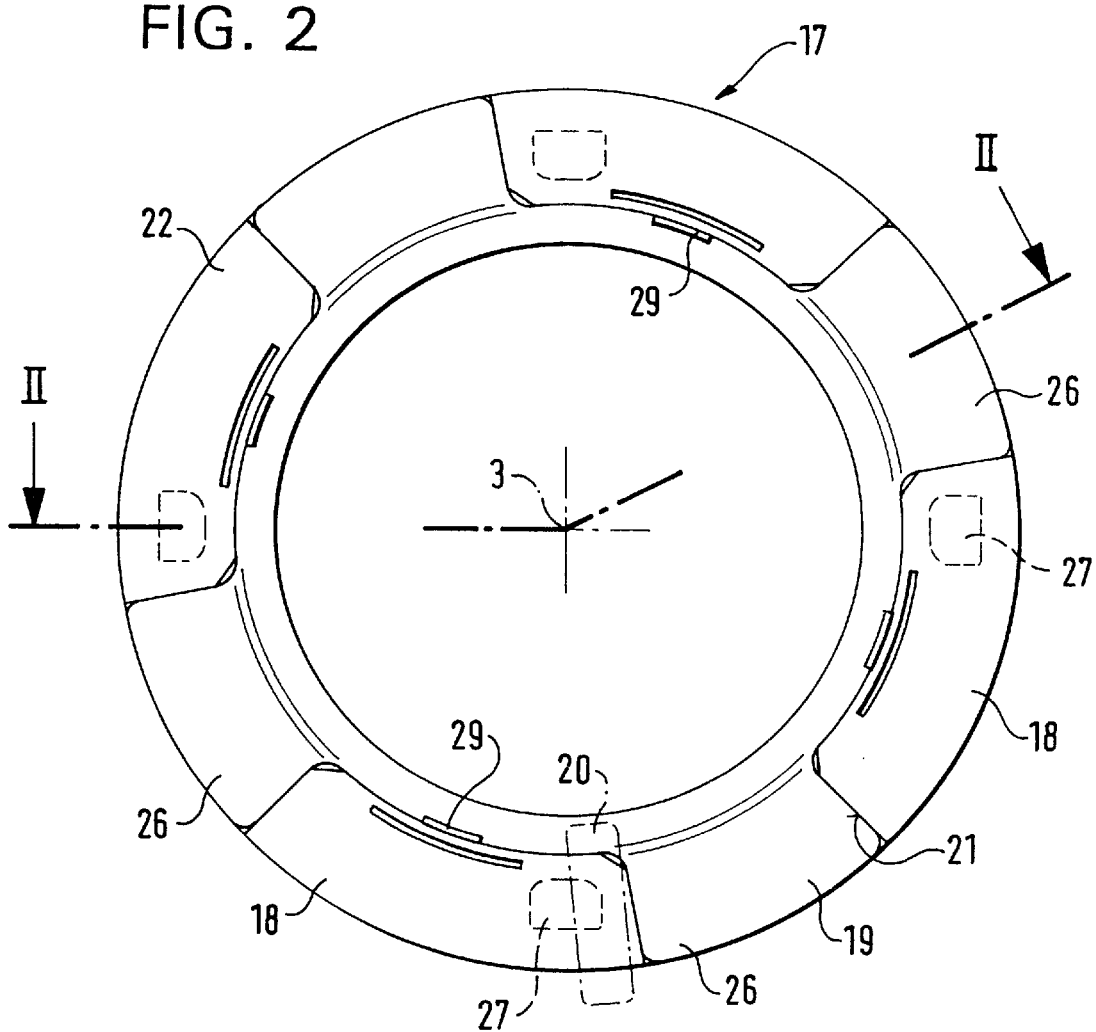
FIG. 2 is a plan view of a friction disc.
Figure 3:
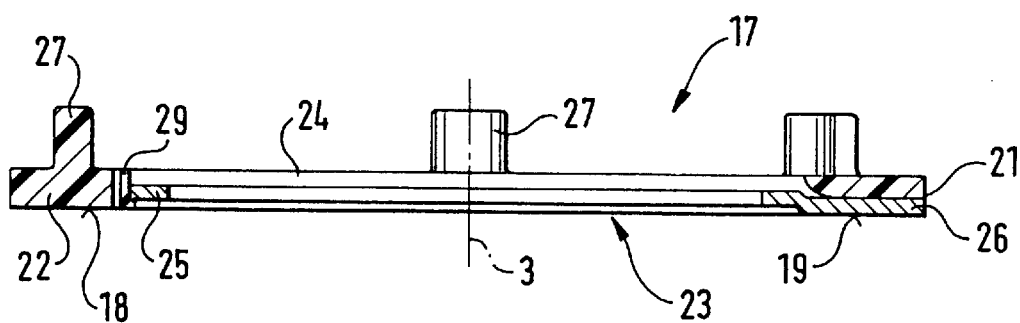
FIG. 3 is a section view II—II through the friction disc shown in FIG. 2.

This retaining capability is used during the preliminary assembly of the carrier 22 and the insert 23, The peripheral distribution of the friction areas 18 and 19 is illustrated in FIG. 2 in particular. The friction disc 17, consisting of the carrier 22 and the insert 23, is inserted between the hub disc 4 and the cover plate 5 so that on one hand, the pins 27 extend into the openings 28 of the hub disc 4 and on the other hand the spring 30 is located between the friction disc 17 and the hub disc 4. The spring 30 pushes the friction disc 17 toward the cover plate 5, which in the vicinity of the friction areas 18 and 19 has contact areas 20 which are worked out of the flat material of the cover plate 5 toward the hub disc 4. The location and orientation of one of these contact areas 20 is illustrated in FIGS. 1 and 2. Generally, there can be as many contact areas 20 distributed over the periphery as there are tabs 26 on the insert 23.

Figure 4A:
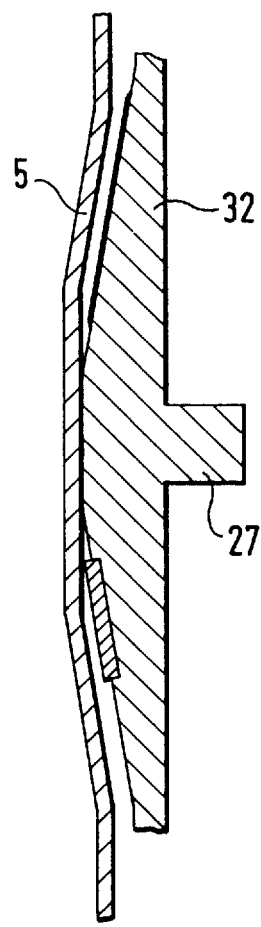
FIG. 4a shows a first operational phase of a friction device, with inclined friction areas and contact areas.
Figure 4B:
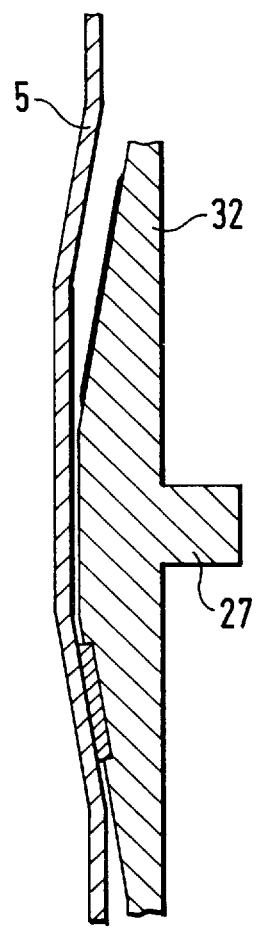
Figure 4C:
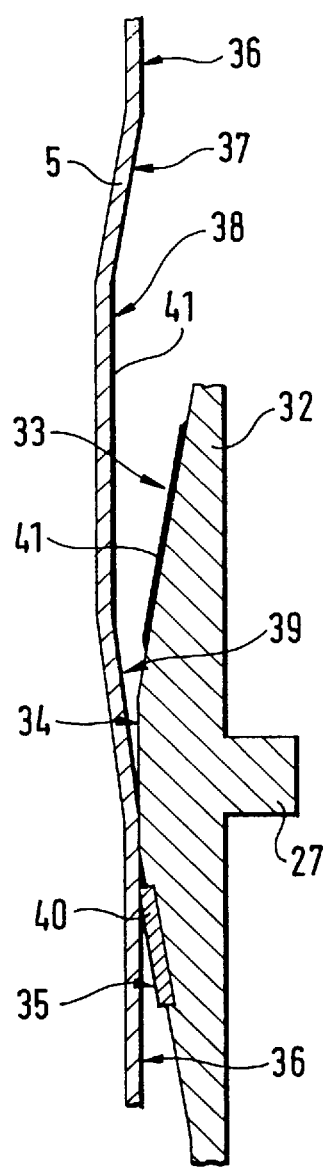

FIGS. 4a, 4b and 4c each show a sectional view of a friction device like the one illustrated in cross section I—I in FIG. 1, and illustrated in FIG. 1a. FIG. 4a shows a friction disc 32 which has at least one axially projecting pin 27 for the non-rotational connection with the hub disc 4. Opposite the friction disc 32 there is an area of the cover plate 5. These two areas, when they rotate relative to one another, generate different frictional forces viewed over the angle of rotation.

In the rest position illustrated in FIG. 4a, two flat areas are in contact with one another. The one contact area 38 is on the cover plate 5 and the other is on the friction area 34 of the friction disc 32 (the complete reference numbers are indicated in FIG. 4c). Viewed peripherally, the contact area 38 of the cover plate 5 is larger than the friction area 34 of the friction disc 32, as a result of which the friction force in this first stage will be maintained until the contact area 38 leaves the friction area 34. Both the cover plate 5 and the friction disc 32, adjacent to the contact area 38 and the friction area 34 respectively, are provided with wider peripheral areas, which are both offset in the same direction.

It thereby becomes possible, as illustrated by way of example in FIG. 4b, when there is a relative rotation in one direction of rotation, to realize a very rapid transition into the generation of friction force between the contact area 39 and the friction area 35. In the embodiment shown in FIGS. 4a, 4b and 4c, the friction area 35 is realized by a friction lining 40 worked or recessed into the surface.

When there is a continued relative rotation in the same direction, the situation illustrated in FIG. 4c arises. The contact area 39 moves along the friction area 35 until two flat areas are again on top of one another, namely the contact area 36 of the cover plate 5 and the friction area 34 of the friction disc 32. If a relative movement takes place in the opposite direction of that shown in FIGS. 4b and 4c, then the inclined areas 33 and 37 can be in contact with the contact area 38 and the friction area 34.

As shown in FIGS. 4a, 4b and 4c, specified different materials can be used for a controlled generation of friction. For example, in the embodiment shown the flat contact area 38 is provided with a coating 41, which realizes a defined preferably lower coefficient of friction than the friction area 34 of the friction disc 32, which is untreated. For the one direction of rotation as illustrated in FIG. 4b, a friction lining 40 can be inserted into the friction disc 32, which makes possible a defined preferably higher friction than the contact area 39, which can be uncoated.

In the adjacent area, as shown in FIG. 4c, the cover plate 5 comes directly into contact with the friction disc 32, as a result of which there is an additional friction force. As illustrated in FIG. 4b and FIG. 4c, when there is a relative rotation in the opposite direction, e.g. as a result of the coating 41 which is located either on the friction disc 32 as shown or which can also be located on the cover plate 5, another friction force can be generated in this load direction.

The functioning of the clutch disc 1 is described below:

When the clutch disc 1 is equipped with an idle damper 15 and toothing 16 with clearance in the peripheral direction between the hub disc 4 and the hub 2, the parts 4, 5 and 6, together with the springs 12, are to be considered a single part, as long as the effective range of the idle damper 15 or the clearance of the toothing 16 in the peripheral direction is not exceeded. In this range of action, no friction force is generated by the friction disc 17.

When the range of action of the idle damper is exceeded, there is a relative rotation between the cover plates 5 and 6 and the hub disc 4, whereupon there is also a relative rotation between the cover plate 5 and the friction disc 17. Since the friction forces should also increase, if possible, to damp vibrations with an increasing angle of rotation, the contact areas 20 in the rest position of the load damper are preferably located on a friction area 18 which is formed by the plastic carrier 22. Thus, in the first range of relative movement between the hub disc 4 and the cover plate 5, a movement of the contact areas 20 on the friction area 18 can generate a low friction force.

As the angle of rotation increases, each of the contact areas 20 moves toward a corresponding tab 26 of the insert 23, and when the movement exceeds the tangential width of the material of the non-notched portion of the carrier 22, the friction can increase sharply, on account of the higher coefficient of friction. When the load is removed from the clutch disc, this relative movement occurs in the reverse direction, and the friction can change from a higher to a lower level.

Naturally, the friction device which employs the friction disc 17 described above can also be used in a clutch disc 1 without an idle damper. A known clutch disc of this type is described in U.S. Pat. No. 4,014,423. In that case, the hub disc 4 is connected directly to the hub 2, and the friction disc 17 generates a friction force whenever there is a relative movement. This friction force generation will also take place in the range of the low torque load, opposite a friction area 18 which has a lower coefficient of friction, and only as the angle of rotation increases will the friction force increase in connection with a friction area 19 which preferably has a higher coefficient of friction.

The preferable increase in the friction force can be influenced to a certain extent, because the dividing lines between the individual friction areas 18 and 19 need not necessarily run in the radial direction, but can also run diagonally. The transitional area from the lower to the higher friction force, and vice-versa, can thereby be extended to a larger angular area.

Section I—I in FIG. 1, shown in FIG. 1a, shows how, during a relative movement between the cover plate 5 and the carrier 22, a contact area 20 slides toward the separating line between the friction area 18 and the friction area 19. FIG. 1a also shows that each notch 21 in the carrier 22 locates a tab 26 of the insert 23. By coordinating the depth of the notch 21 with the thickness of the tabs 26, it is possible to achieve a continuous, flat transition between the friction areas 18 and 19.

One feature of the present invention resides broadly in the clutch disc 1 for a friction clutch of a motor vehicle, comprising an input part which is provided with friction linings 8, an output part which is provided with internal gear teeth (not shown) for non-rotational attachment to a transmission input shaft, a concentric arrangement of the two groups for their mutually restricted rotation against the force of at least one spring device, in particular in the form of several concentrically-arranged coil springs 12 which are inserted in apertures 14 of the input part and apertures 13 of the output part, at least one friction device which is active in the event of a relative rotation, which friction device is located between facing sides of the input part (as for example, cover plate 5) and the output part (as for example, hub disc 4) and is under the force of an axially acting device, preferably a spring 30, characterized by the fact that the friction device contains a concentric friction disc 17; 32 which has a plurality of friction areas 18, 19; 33, 34, 35 which are distributed over the periphery and which have different coefficients of friction, whereby the friction disc 17 is non-rotationally located on one of the components, i.e. the input part 5 or output part 4, and the other component is in contact against the friction disc 17; 32 by means of specified contact areas 20; 36–39, that each contact area 20; 36–39, in the context of the possible relative rotation, travels at least partly essentially from one friction area 18; 34 to another friction area 19; 33, 35.

Another feature of the invention resides broadly in the clutch disc 1 characterized by the fact that the friction disc 17; 32 has friction areas 18, 19; 33–35 which have different coefficients of friction on the side facing the contact areas 20; 36–39.

Yet another feature of the invention resides broadly in the clutch disc 1 characterized by the fact that the friction disc 17; 32 is covered by materials which have different coefficients of friction.

Still another feature of the invention resides broadly in the clutch disc 1 characterized by the fact that the friction disc 17 is assembled from a plurality of components, preferably two components, preferably carrier 22 and insert 23, which preferably have different coefficients of friction.

A further feature of the invention resides broadly in the clutch disc 1 characterized by the fact that the friction disc 17 consists of a carrier 22 which is preferably made of plastic and which has a first, lower coefficient of friction, and forms the one flat friction area 18 which is concentric and perpendicular to the axis of rotation 3, that in the friction area 18 at least at one point—and preferably in a plurality of points distributed over the periphery—there is a notch 21 which runs essentially radially, in which an insert 23 is located which is made of a material which has a second, higher coefficient of friction, and which forms a friction area 19 in the same plane as the friction area 18 of the carrier 22.

Another feature of the invention resides broadly in the clutch disc 1 characterized by the fact that a non-rotational connection is created between the carrier 22 and the insert 23 by means of the notches 21 and the areas tabs 26 of the insert 23 which are engaged in the notches 21.

Yet another feature of the invention resides broadly in the clutch disc 1 characterized by the fact that the carrier 22 has a central opening 24, that the insert 23 has a ring 25 which has a plurality of tabs 26 which project radially tabs 26, and the ring 25 is inserted in the central opening 24 and the tabs 26 are engaged in the corresponding notches 21 of the carrier 22.

Still another feature of the invention resides broadly in the clutch disc 1 characterized by the fact that the carrier 22, on the side farther from the friction area 18, has at least one pin 27 which projects axially and which is engaged in a corresponding opening 28 essentially without clearance in the peripheral direction in the input part 5, 6 or the output part 4, and the contact area 20 is located in the other part.

A further feature of the invention resides broadly in the clutch disc 1 characterized by the fact that the ring 25 of the insert 23 is offset with respect to the tabs 26 axially away from the plane of the friction areas 18, 19 toward the carrier 22, and radially flexible fingers 29 are located in the opening 24 of the carrier 22 to hold the ring 25 in a pre-installation position.

Another feature of the invention resides broadly in the clutch disc 1 characterized by the fact that the friction disc 32, at least at one point on the periphery of friction disc 32, has a flat friction area 34 in a plane 7 which is perpendicular to the axis of rotation 3, and adjacent to the plane 7 in each direction of rotation, has at least one additional friction area 33, 35, which encloses an angle with the plane 7, and that in a similar manner, the other component 5 has a flat contact area 38, and adjacent to it in each direction of rotation comprises at least one additional contact area 37, 39 which has the same angular inclination, and the flat contact area 38 is larger in the peripheral dimension than the flat friction area 34, Yet another feature of the invention resides broadly in the clutch disc 1 characterized by the fact that the other component 5, adjacent to each offset contact area 37, 39 has an additional contact area 36 which runs parallel to the friction area 34.

Still another feature of the invention resides broadly in the clutch disc 1 characterized by the fact that both the friction disc 32 and the other component 5 can be provided, at least in places, with a coating 41 or with a friction lining 40 to generate a desired friction force.

A further feature of the invention resides broadly in the clutch disc 1 characterized by the fact that the clutch disc 1 has a hub 2 which has external toothing 16, in which a hub disc 4 which has internal toothing (not shown) is engaged, this external toothing 16 and internal toothing is provided with limited clearance in the peripheral direction, cover plates 5, 6 are located on both sides of the hub disc 4 and are non-rotationally connected and held at a distance from one another, one of the cover plates 5 is provided on the radial outside with friction linings 8, coil springs 12 in apertures 13, 14 of the hub disc 4 and cover plates 5, 6 represent a load spring, an idle damper 15 is located axially between the hub disc 4 and the one cover plate 6, the friction disc 17; 32 and a spring 30 are located on the other side of the hub disc 4 between the hub disc 4 and the other cover plate 5, contact areas 20; 36–39 are realized in the cover plate 5 in the vicinity of the friction disc 17; 32, and both the non-rotational drive of the idle damper and of the carrier 22 of the friction disc 17 and of the friction disc 32 take place in common openings 28 of the hub disc 4.

Examples of clutch discs which could possibly be adapted for use in the present invention, along with additional components generally associated with clutch discs which might be interchangeable with, or adaptable as, components of the embodiments as described hereinabove, might be disclosed by the following U.S. Patents, all of which are assigned to Fichtel & Sachs AG, the assignee of the present invention: U.S. Pat. No. 5,431,269, U.S. Pat. No. 5,251,736, U.S. Pat. No. 5,249,660, U.S. Pat. No. 5,238,096 and U.S. Pat. No. 5,213,188.

Additional examples of clutch discs which could possibly be adapted for use in the present invention, along with additional components generally associated with clutch discs which might be interchangeable with, or adaptable as, components of the embodiments as described hereinabove, might be disclosed by the following U.S. Patents; U.S. Pat. No. 5,450,935, U.S. Pat. No. 5,468,189, U.S. Pat. No. 5,456,634, U.S. Pat. No. 5,401,213 and U.S. Pat. No. 5,180,335.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 196 14 002.1, filed Apr. 9, 1996, and 195 28 143.8, filed Aug. 1, 1995, having inventors Jürgen Kleifges, Matthias Fischer, Norbert Lohaus, and DE-OS 196 14 002.1 and 195 28 143.8 and DE-PS 196 14 002.1 and 195 28 143.8, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function, and not only structural equivalents but also equivalent structures thereof.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a friction clutch, said clutch disc comprising:

an input part;

said input part being oriented concentrically about a rotational axis;

an output part;

said output part being oriented concentrically about the rotational axis;

the rotational axis defining an axial direction;

the axial direction being generally parallel to the rotational axis;

said input part having limited rotational play in relation to said output part;

said limited rotational play comprising a relative angular displacement of said clutch disc;

a friction device;

said friction device comprising:

a friction disc;

said friction disc being oriented concentrically about the rotational axis;

said friction disc comprising means for being non-rotatably connected to one of: said input part and said output part;

the other of said input part and said output part comprising a friction component;

at least one of: said friction disc and said friction component comprising a first friction area and a second friction area;

said first friction area comprising a first coefficient of friction;

said second friction area comprising a second coefficient of friction;

the first coefficient of friction being different than the second coefficient of friction;

said friction disc being disposed to make contact with said friction component;

means for axially loading said friction disc against said friction component; and a portion of said first friction area and a portion of said second friction area being disposed to sequentially contact at least one portion of the other of said friction disc and said friction component upon the limited angular displacement of said clutch disc upon operation of said clutch disc.

2. The clutch disc according to claim 1, wherein:

said friction disc comprises a first side and a second side;

said first side of said friction disc being disposed an axial distance from said second side of said friction disc;

said first side being disposed adjacent said friction component;

said friction disc comprises said first friction area and said second friction area; and said first side of said friction disc comprises said first friction area and said second friction area.

3. The clutch disc according to claim 2, wherein:

said first friction area comprises a first material;

said second friction area comprises a second material; and said first material is different than said second material.

4. The clutch disc according to claim 2, wherein:

said friction disc comprises a plurality of component parts;

said plurality of friction disc component parts comprises a first component part and a second component part;

said first component part comprises said first friction area; and said second component part comprises said second friction area.

5. The clutch disc according to claim 4, wherein:

said first component part of said friction disc is a carrier;

said carrier is made of plastic;

said carrier further comprises at least one notched portion, whereas the remainder of said carrier comprises an unnotched portion;

a portion of said unnotched portion comprises said first friction area of said carrier;

said second component part of said friction disc is an insert;

said insert further comprises at least one tabbed portion;

a portion of said at least one tabbed portion comprises said second friction area of said insert;

the first coefficient of friction of said carrier is less than the second coefficient of friction of said insert;

said at least one notched portion of said carrier comprises a thickness;

the thickness of said at least one notched portion is generally parallel to the rotational axis;

said unnotched portion of said carrier comprises a thickness;

the thickness of said unnotched portion is generally parallel to the rotational axis;

the thickness of said unnotched portion of said carrier being substantially greater than the thickness of said at least one unnotched portion of said carrier;

said at least one tabbed portion of said insert comprises a thickness;

the thickness of said at least one tabbed portion being generally parallel to the rotational axis;

means for non-rotatably connecting said carrier and said insert;

said means for non-rotatably connecting said carrier and said insert comprises;

said at least one notched portion of said carrier;

said at least one tabbed portion of said insert; and said at least one tabbed portion being disposed to engage said at least one notched portion for non-rotatably connecting said carrier and said insert;

said first side of said friction disc comprising said at least one tabbed portion of said insert and said unnotched portion of said carrier;

the sum of: the thickness of said at least one tabbed portion of said insert and the thickness of said at least one notched portion of said carrier is substantially the same as the thickness of said unnotched portion of said carrier;

said first side of said friction disc is oriented substantially in one plane; and the plane of said first side of said friction disc being disposed generally perpendicular to the axis of rotation.

6. The clutch disc according to claim 5, further comprising:

said carrier comprising a central opening;

said central opening being oriented concentrically about the rotational axis;

said insert comprising a ring portion;

said ring portion being oriented concentrically about the rotational axis;

said at least one tabbed portion of said insert extending radially away from said ring portion;

means for locating said insert with respect to said carrier; and said means for locating said insert with respect to said carrier comprising:

said ring portion of said insert;

said central opening of said carrier; and said ring portion being disposed to engage said central opening.

7. The clutch disc according to claim 6, further comprising:

means for holding said insert in a pre-installation position;

said pre-installation holding means comprising:

said ring portion of said insert;

said ring portion being disposed a substantial axial distance from said at least one tabbed portion;

said ring portion comprising a plurality of fingers;

each of said plurality of fingers being oriented concentrically about the rotational axis;

each of said plurality of fingers extending a substantial distance in the axial direction from said ring portion;

each of said plurality of fingers comprising a radial resilience; and each of said plurality of fingers disposed to engage said central opening of said carrier for holding said insert in a pre-installation position; and said friction disc means for being non-rotatably connected to one of: said input part and said output part comprises:

said carrier;

said carrier comprising at least one pin;

said at least one pin extending a substantial distance in the axial direction from said carrier;

said one of: said input part and said output part further comprising at least one opening; and said at least one pin of said carrier being at least partially disposed essentially without tangential clearance in said at least one opening for non-rotatably connecting said friction disc and said one of: said input part and said output part.

8. The clutch disc according to claim 3, further comprising:

the limited rotational play of said clutch disc comprising limited rotational play in a first direction of rotation;

said limited rotational play of said clutch disc comprising limited rotational play in a second direction of rotation;

the first direction of rotation being opposite the second direction of rotation;

the limited rotational play in the first direction comprising a first angular displacement and a second angular displacement;

the second angular displacement in the first direction being greater than the first angular displacement in the first direction;

the limited rotational play in the second direction comprising a first angular displacement and a second angular displacement;

the second angular displacement in the second direction being greater than the first angular displacement in the second direction;

said friction disc comprises a third friction area;

said first friction area comprising a plane surface;

said plane surface of said first friction area being oriented generally perpendicular to the rotational axis;

said first friction area comprising a first side and a second side;

said first side being disposed a substantial circumferential distance from said second side;

said second friction area being disposed immediately adjacent said first side of said first friction area;

said second friction area being oriented at an acute angle to the rotational axis;

said third friction area being disposed immediately adjacent said second side of said first friction area;

said third friction area being oriented at an acute angle to the rotational axis;

said friction component comprising a first contact surface;

said first contact surface comprising a plane surface;

said plane surface of said first contact surface being oriented generally perpendicular to the rotational axis;

said first contact surface comprising a first side and a second side;

said first side of said first contact surface being disposed a substantial circumferential distance from said second side of said first contact surface;

the circumferential distance of said first contact surface being substantially greater than the circumferential distance of said first friction area;

said friction component comprises a second contact surface;

said second contact surface being oriented at an acute angle to the rotational axis;

the orientation angle of said second contact surface being about equal to the orientation angle of said second friction surface;

said friction component comprising a third contact surface;

said third contact surface being oriented at an acute angle to the rotational axis;

the orientation angle of said third contact surface being about equal to the orientation angle of said third friction surface;

a portion of said first friction area being disposed to contact a portion of said first contact area upon the limited angular play of said clutch disc in the first direction being equal to or less than the first angular displacement in the first direction of rotational play;

a portion of said second friction area being disposed to contact a portion of the second contact area upon the limited angular play of said clutch disc in the first direction exceeding the first angular displacement in the first direction of rotational play;

a portion of said first friction area being disposed to contact a portion of said first contact area upon the limited angular play of said clutch disc in the second direction being less than or equal to the first angular displacement in the second direction of rotational play; and a portion of said third friction area being disposed to contact a portion of said third contact area upon the limited angular play of said clutch disc in th second direction exceeding the first angular displacement in the second direction of rotational play.

9. The clutch disc according to claim 8, further comprising:

the limited rotational play in the first direction of rotation further comprising a third angular displacement;

the third angular displacement in the first direction being greater than the second angular displacement in the first direction;

said limited rotational play in the second direction of rotation further comprising a third angular displacement;

said third angular displacement in the second direction being greater than the second angular displacement in the second direction;

said friction component further comprising a fourth contact area and a fifth contact area;

said fourth contact area comprising a plane surface;

said plane surface of said fourth contact area being oriented generally perpendicular to the rotational axis;

said fourth contact area being disposed immediately adjacent said second contact area;

said fifth contact area comprising a plane surface;

said plane surface of said fifth contact area being oriented generally perpendicular to the rotational axis;

said fifth contact area being disposed immediately adjacent said third contact area;

a portion of said first friction area being disposed to contact a portion of said fourth contact area upon the limited angular play of said hub disc in the first direction exceeding the second angular displacement in the first direction of rotational play; and a portion of said first friction area being disposed to contact a portion of said fifth contact area upon the limited angular play of the hub disc in the second direction exceeding the second angular displacement in the second direction of rotational play.

10. The clutch disc according to claim 9, wherein at least one of: said first friction area, said second friction area, said third friction area, said first contact area, said second contact area, said third contact area, said fourth contact area and said fifth contact area further comprise at least one of: a coating lining and a friction lining.

11. A clutch disc for a motor vehicle clutch, said clutch disc comprising:

a hub;

said hub being oriented concentrically about a rotational axis;

the rotational axis defining an axial direction;

the axial direction being generally parallel with the rotational axis;

said hub comprising external toothing;

a first cover plate and a second cover plate;

each of said first cover plate and said second cover plate being oriented concentrically about the rotational axis;

each of said first cover plate and said second cover plate comprising at least one aperture;

said first cover plate being non-rotationally connected to said second cover plate;

said first cover plate being fixedly held an axial distance from said second cover plate;

said first cover plate being operatively connected to friction lining means;

said friction lining means being disposed on the radial outside of said first cover plate;

a hub disc;

said hub disc being oriented concentrically about the rotational axis;

said hub disc being disposed between said first cover plate and said second cover plate;

said hub disc comprising at least one aperture;

said hub disc comprising a plurality of openings;

said hub disc comprising internal toothing;

said external toothing of said hub being disposed to engage said internal toothing of said hub disc for non-rotatably connecting said hub and said hub disc;

said engagement of said hub and said hub disc comprising limited clearance in the circumferential direction about the rotational axis;

a load spring device;

said load spring device comprising:
  at least one coil spring; and
  said at least one coil spring being disposed in: said at least one aperture of said hub disc, said at least one aperture of said first cover plate and said at least one aperture of said second cover plate;

said load spring device for limited rotational play of said hub disc in relation to said first cover plate and said second cover plate;

said limited rotational play comprising a relative angular displacement of said clutch disc;

an idle damper;

said idle damper being disposed between said hub disc and said second cover plate;

means for non-rotatably connecting said idle damper and said hub disc;

said idle damper connecting means comprising at least one of said plurality of openings of said hub disc;

a friction device; and said friction device comprising:
  a friction disc;
  said friction disc being oriented concentrically about the rotational axis;
  said friction disc being disposed between said first cover plate and said hub disc;
  means for non-rotatably connecting said friction disc to said hub disc;
  said first cover plate;
  at least one of: said friction disc and said first cover plate comprising a first friction area and a second friction area;
  said first friction area comprising a first coefficient of friction;
  said second friction area comprising a second coeffcent of friction;
  the first coefficient of friction being different than the second coefficient of friction;
  said friction disc being disposed to make contact with at least one portion of said first cover plate;
  spring means;
  said spring means being disposed between said hub disc and said friction disc;
  said spring comprising means for axially loading said friction disc against said first cover plate; and
  a portion of said first friction area and a portion of said second friction area being disposed to sequentially contact a portion of said first cover plate upon the relative angular displacement of said clutch disc to vary the friction force between said friction disc and said first cover plate.

12. The clutch disc according to claim 11, wherein:

said friction disc comprises a first side and a second side;

said first side of said friction disc being disposed an axial distance from said second side of said friction disc;

said first side of said friction disc being disposed adjacent said first cover plate; and said first side of said friction disc comprises said first friction area and said second friction area.

13. The clutch disc according to claim 12, wherein:

said first friction surface comprises a first material;

said second friction surface comprises a second material; and said first friction material is different than said second friction material.

14. The clutch disc according to claim 12, wherein:

said friction disc comprises a plurality of component parts;

said plurality of friction disc component parts comprises a first component part and a second component part;

said first component part comprises said first friction area;

said second component part comprises said second friction area;

said first component part is a carrier; and said means for non-rotatably connecting said friction disc to said hub disc comprises:

said carrier;

said carrier comprising at least one pin;

said at least one pin extending a substantial distance in the axial direction from said carrier;

said one of: said input part and said output part further comprising at least one opening; and said at least one pin of said carrier being at least partially disposed essentially without tangential clearance in the remainder of said plurality of openings of said hub disc.

15. The clutch disc according to claim 14, wherein:

said carrier is made of plastic;

said carrier further comprises at least one notched portion, whereas the remainder of said carrier comprises an unnotched portion;

a portion of said unnotched portion comprises said first friction area of said carrier;

said second component part of said friction disc is an insert;

said insert further comprises at least one tabbed portion;

a portion of said at least one tabbed portion comprises said second friction area of said insert;

the first coefficient of friction of said carrier is less than the second coefficient of friction of said insert;

said at least one notched portion of said carrier comprises a thickness;

the thickness of said at least one notched portion is generally parallel to the rotational axis;

said unnotched portion of said carrier comprises a thickness;

the thickness of said unnotched portion is generally parallel to the rotational axis;

the thickness of said unnotched portion of said carrier being substantially greater than the thickness of said at least one unnotched portion of said carrier;

said at least one tabbed portion of said insert comprises a thickness;

the thickness of said at least one tabbed portion being generally parallel to the rotational axis;

means for non-rotatably connecting said carrier and said insert;

said means for non-rotatably connecting said carrier and said insert comprises:
  said at least one notched portion of said carrier;
  said at least one tabbed portion of said insert; and
  said at least one tabbed portion being disposed to engage said at least one notched portion for non-rotatably connecting said carrier and said insert;

said first side of said friction disc comprising said at least one tabbed portion of said insert and said unnotched portion of said carrier;

the sum of: the thickness of said at least one tabbed portion of said insert and the thickness of said at least one notched portion of said carrier is substantially the same as the thickness of said unnotched portion of said carrier;

said first side of said friction disc is oriented substantially in one plane; and the plane of said first side of said friction disc being disposed generally perpendicular to the axis of rotation.

16. The clutch disc according to claim 15, further comprising:

said carrier comprising a central opening;

said central opening being oriented concentrically about the rotational axis;

said insert comprising a ring portion;

said ring portion being oriented concentrically about the rotational axis;

said at least one tabbed portion of said insert extending radially away from said ring portion;

means for locating said insert to said carrier;

said means for locating said insert with respect to said carrier comprising said ring portion and said central opening; and said ring portion being disposed to engage said central opening for locating said insert.

17. The clutch disc according to claim 16, further comprising:

means for holding said insert in a pre-installation position;

said pre-installation holding means comprising:
  said ring portion of said insert;
  said ring portion being disposed a substantial axial distance from said at least one tabbed portion;
  said ring portion comprising a plurality of fingers;
  each of said plurality of fingers being oriented concentrically about the rotational axis;
  each of said plurality of fingers extending a substantial distance in the axial direction from said ring portion;
  each of said plurality of fingers comprising a radial resilience; and
  each of said plurality of fingers disposed to engage said central opening of said carrier for holding said insert in a pre-installation position.

18. The clutch disc according to claim 13, wherein:

said friction disc comprises a carrier;

said carrier comprises at least one pin;

said at least one pin extends a substantial distance in the axial direction;

said at least one pin being disposed to engage the remainder of said at least one opening of said hub disc for non-rotatably connecting said friction disc and said hub disc;

the limited rotational play of said load spring device comprises limited rotational play in a first direction of rotation;

the limited rotational play of said load spring device comprises limited rotational play in a second direction of rotation;

the first direction of rotation being opposite the second direction of rotation;

the limited rotational play in the first direction comprising a first angular displacement and a second angular displacement;

the second angular displacement in the first direction being greater than the first angular displacement in the first direction;

the limited rotational play in the second direction comprising a first angular displacement and a second angular displacement;

the second angular displacement in the second direction being greater than the first angular displacement in the second direction;

said friction disc comprises a third friction area;

said first friction area comprising a plane surface;

said plane surface of said first friction area being oriented generally perpendicular to the rotational axis;

said first friction area comprising a first side and a second side;

said first side being disposed a substantial circumferential distance from said second side;

said second friction area being disposed immediately adjacent said first side of said first friction area;

said second friction area being oriented at an acute angle to the rotational axis;

said third friction area being disposed immediately adjacent said second side of said first friction area;

said third friction area being oriented at an acute angle to the rotational axis;

said first cover plate comprising a first contact surface;

said first contact surface comprising a plane surface;

said plane surface of said first contact surface being oriented generally perpendicular to the rotational axis;

said first contact surface comprising a first side and a second side;

said first side of said first contact surface being disposed a substantial circumferential distance from said second side of said first contact surface;

the circumferential distance of said first contact surface being substantially greater than the circumferential distance of said first friction area;

said first cover plate comprising a second contact surface;

said second contact surface being oriented at an acute angle to the rotational axis;

the orientation angle of said second contact surface being about equal to the orientation angle of said second friction surface;

said first cover plate comprising a third contact surface;

said third contact surface being oriented at an acute angle to the rotational axis;

the orientation angle of said third contact surface being about equal to the orientation angle of said third friction surface;

a portion of said first friction area being disposed to contact a portion of said first contact area upon the limited angular play of said load spring device in the first direction not exceeding the first angular displacement in the first direction of rotational play;

a portion of said second friction area being disposed to contact a portion of the second contact area upon the limited angular play of said load spring device in the first direction exceeding the first angular displacement in the first direction of rotational play;

a portion of said first friction area being disposed to contact a portion of said first contact area upon the limited angular play of said load spring device in the second direction not exceeding the first angular displacement in the second direction of rotational play;

a portion of said third friction area being disposed to contact a portion of said third contact area upon the limited angular play of said load spring device in the second direction exceeding the first angular displacement in the second direction of rotational play.

19. The clutch disc according to claim 18, further comprising:

the limited rotational play in the first direction of rotation further comprising a third angular displacement;

the third angular displacement in the first direction being greater than the second angular displacement in the first direction;

the limited rotational play in the second direction of rotation further comprising a third angular displacement;

said third angular displacement in the second direction being greater than the second angular displacement in the second direction;

said first cover plate further comprising a fourth contact area and a fifth contact area;

said fourth contact area comprising a plane surface;

said plane surface of said fourth contact area being oriented generally perpendicular to the rotational axis;

said fourth contact area being disposed immediately adjacent said second contact area;

said fifth contact area comprising a plane surface;

said plane surface of said fifth contact area being oriented generally perpendicular to the rotational axis;

said fifth contact area being disposed immediately adjacent said third contact area;

a portion of said first friction area being disposed to contact a portion of said fourth contact area upon the limited angular play of said load spring device in the first direction exceeding the second angular displacement in the first direction of rotational play; and a portion of said first friction area being disposed to contact a portion of said fifth contact area upon the limited angular play of said load spring device in the second direction exceeding the second angular displacement in the second direction of rotational play.

20. The clutch disc according to claim 19, wherein at least one of: said first friction area, said second friction area, said third friction area, said first contact area, said second contact area, said third contact area, said fourth contact area and said fifth contact area further comprise at least one of: a coating lining and a friction lining.

* * * * *

UNITED STATES PATENT AND TRADEMARK OFFICE
CERTIFICATE OF CORRECTION

PATENT NO. : 5,771,999
DATED : June 30, 1998
INVENTOR(S) : Jürgen KLEIFGES, Matthias FISCHER, and Norbert LOHAUS It is certified that error appears in the above-identified patent and that said Letters Patent is hereby corrected as shown below:

In column 11, line 18, Claim 1, after 'component;', delete "and" and insert the following new paragraph:

--said friction disc and said friction component being rotatable with respect to each other; and--.

In column 16, line 34, Claim 11, after 'plate;', delete "and" and insert the following new paragraph:

--said friction disc and said first cover plate being rotatable with respect to each other; and--.

Signed and Sealed this

Thirtieth Day of March, 1999

Attest:

Q. TODD DICKINSON

*Attesting Officer*  *Acting Commissioner of Patents and Trademarks*